Nov. 15, 1966   R. W. RAGEN ETAL   3,285,065
SPRING TESTING MACHINE
Filed July 8, 1964   2 Sheets-Sheet 1
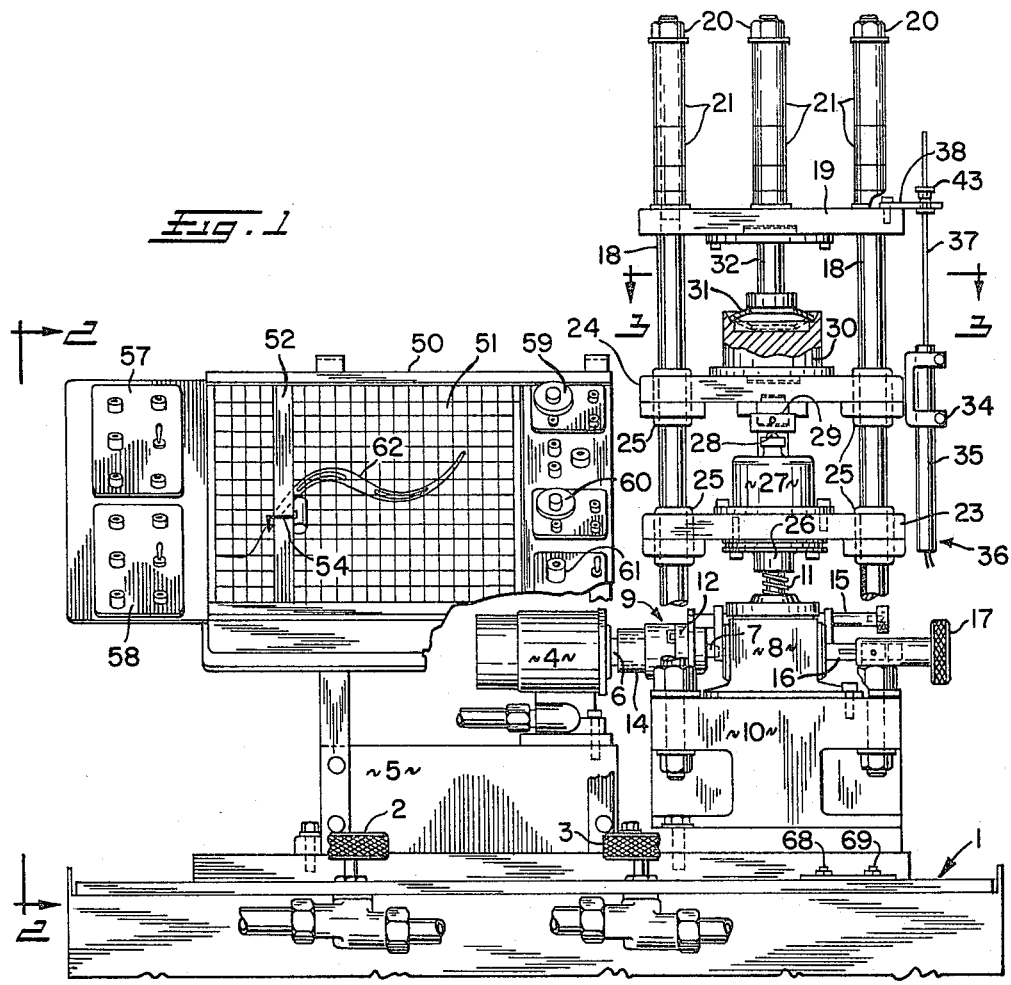
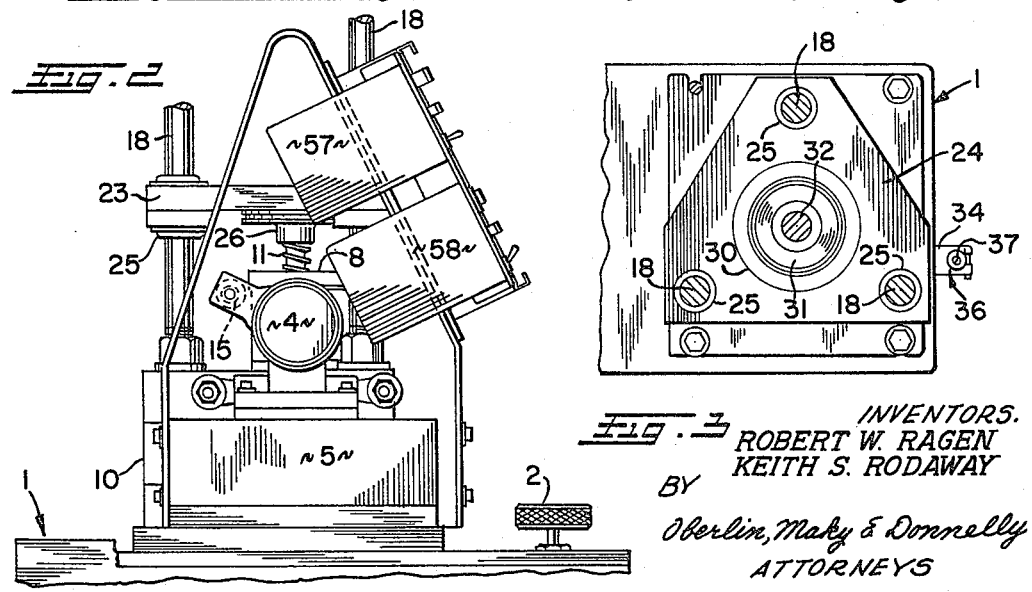
INVENTORS.
ROBERT W. RAGEN
KEITH S. RODAWAY
BY
Oberlin, Maky & Donnelly
ATTORNEYS

United States Patent Office 3,285,065
Patented Nov. 15, 1966

3,285,065
SPRING TESTING MACHINE
Robert W. Ragen, Inglewood, and Keith S. Rodaway, Sherman Oaks, Calif., assignors to Parker Aircraft Co., division of Parker-Hannifin Corporation, Cleveland, Ohio, a corporation of Ohio
Filed July 8, 1964, Ser. No. 381,095
2 Claims. (Cl. 73—161)

The present invention relates generally as indicated to a spring testing machine and more particularly to a machine which plots or graphs the load vs. deflection characteristics of springs.

In precision relief valves and other valves employing spring-biased valve elements or sealing elements for use in space craft and in missile launching equipment, the action of the springs used therein must be extremely precise. Furthermore, in the case of valves employing dished washer springs or the like having non-linear load vs. deflection characteristics, it is required to have such springs operate within precise portions of their load vs. deflection curves. In known spring testing machines calibration of springs is a time-consuming and expensive proposition.

Accordingly, it is a principal object of this invention to provide a spring testing machine by which accurate and rapid checks may be made of any of a wide variety of sizes and types of springs.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

In said annexed drawings:

FIG. 1 is a front elevation view of a preferred embodiment of the present invention;

FIG. 2 is a side elevation view as viewed from the left-hand side of FIG. 1;

FIG. 3 is a horizontal cross-section view taken substantially along the line 3—3, FIG. 1; and FIG. 4 is a schematic diagram illustrating the manner in which the load and deflection characteristics of a spring under test are correlated to provide a trace from which it can be readily determined how much the spring should be deflected when installed in a precision relief valve or the like.

Figure 4:
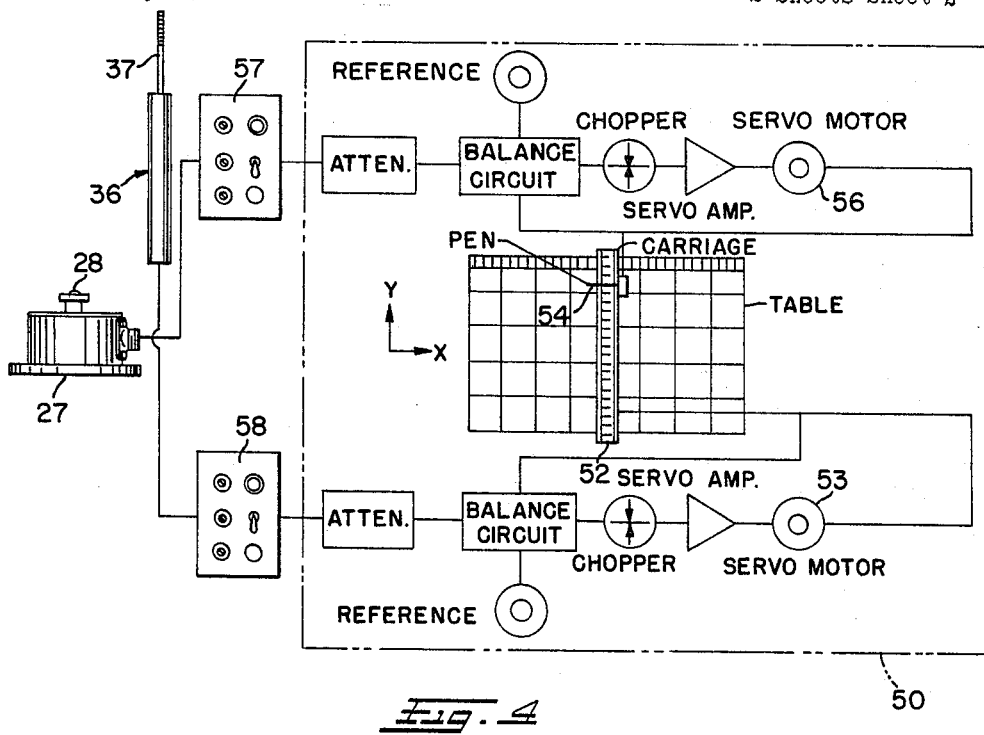

Referring now more particularly to the drawings, the machine comprises a base or cabinet structure 1 in which is disposed an electric motor-driven hydraulic pump unit (not shown) having suitable speed controls 2 and 3 arranged to operate the hydraulic motor 4 at any desired adjustable speed. The hydraulic motor 4 is mounted on the upstanding portion 5 of said base structure 1 and has its drive shaft 6 operatively coupled with the operating shaft 7 of the screw jack 8 through the clutch coupling 9 when in engaged position as shown in FIG. 1, said jack 8 being mounted on the upstanding portion 10 of said base structure 1. Accordingly, rotation of shaft 7 of said jack 8 in opposite directions by motor 4 moves the screw 11 up and down, and if it be desired to manually adjust the screw 11 up or down, the coupling part 12 is disengaged from the coupling part 14 by shifting the latch 15 to the right (FIG. 1) whereupon the shaft 16 may be turned by the manual drive knob 17 thereon. The jack 8 may be of known construction such as, for example, a bevel gear nut (not shown) in threaded engagement with screw 11 and bevel pinions (not shown) on the respective shafts 7 and 16 meshing with the nut.

The portion 10 of said base structure 1 on which said jack 8 is mounted has three upright posts 18 to which an upper plate 19 is fixedly mounted through nuts 20 and spacers 21. Guided for vertical movement along said posts 18 and two lower plates 23 and 24 which, for low friction movement, are provided with recirculating ball bushings 25. The plate 23 has bolted or otherwise secured thereto the flanged head 26 of the screw 11, whereby said plate 23 is moved up or down in unison with the screw 11. Said plate 23 also has bolted or otherwise secured thereto on the upper side thereof a force transducer 27 which, as hereinafter explained in detail, is of the load cell type which produces an electrical output precisely proportional to the force applied on the center ball 28. By way of example, said force transducer 27 may comprise a precision spring element therein whose deflection is measured as by a sensitive differential transformer element.

The other movable plate 24 has secured on the bottom thereof an adapter assembly 29 through which downward load on the plate 24 is transmitted to the force transducer 27 through the aforesaid balls 28. The upper side of the plate 24 has a spring support plate 30 secured thereto, said support plate 30 being herein shown for use with a Belleville or dished washer spring 31.

The upper fixed plate 19 has secured on the underside thereof a spring-engaging adapter or head 32 which, in the present case, is fashioned to engage the smaller upper side of the spring 31 while the larger lower side of the spring 31 is engaged in a counterbore in the support plate 30.

The movable plate 24 has mounted thereon a bracket 34 vertically adjustably clamping therein the case 35 of a linear transducer 36, the probe assembly 37 of which is vertically adjustably mounted on the bracket 38 of the upper fixed plate 19. Preferably the linear transducer 36 aforesaid is a self-contained package which comprises a transistorized converter, a differential transformer type transducer element, and a phase sensitive demodulator circuit. The linear transducer 36 transmits linear position information electrically, i.e., there is produced a D.C. output voltage which is proportional to the axial displacement of the probe 37 from a center or null position in the case assembly 35. The D.C. output is positive when the probe 37 is positioned to one side of center and negative when the probe 37 is positioned to the other side of center. In the present case it is preferred that the linear transducer 36 be adjusted so that the probe 37 is in the center or null position when the spring 31 to be tested is just a short distance below the head 32. Such adjustment can readily be made by manipulating the adjustable lock assembly 43.

Also mounted on the base structure 1 is an X-Y coordinate recorder 50 which has provision for recording on a sheet 51 of graph paper the load vs. deflection characteristics of a spring under test, the X coordinate being, for example, the deflection as determined by the linear transducer 36 and the Y coordinate being the load as determined by the force transducer 27. As best shown in FIGS. 1 and 4, the X-Y recorder 50 comprises a carriage 52 which is driven along the X-axis by the servo motor 53 in accordance with the signal received from the linear transducer 36. Said carriage 52 has mounted thereon a pen 54 which is driven along the Y-axis by servo motor 56 in accordance with the signal received from the force transducer 27.

One end of the X-Y recorder 50 has mounted thereon two transducer exciter demodulators 57 and 58 which supply regulated 3 kc. excitation, to the respective transducers 27 and 36, demodulate the respective transducer output signals, and supply D.C. output voltages to the respective Y and X circuits of the X-Y recorder 50. Such D.C. output voltages are precisely proportional to the mechanical inputs to the respective transducers 27 and 36. In instruments 57 and 58 of this character it is conventional to employ Zener diode regulating circuits which are free from drift.

The other end of the X-Y recorder 50 has mounted thereon calibration and range controls 59 and 60 for the respective Y and X circuits of the recorder 50 so as to provide desired amplification of the respective force and lineal transducer output signals so that when a trace is made by the pen 54 during loading and deflection of the spring under test, such trace will be of size substantially covering the graph paper 51. The recorder 50 also has controls 61 for moving the pen 54 up during removal and loading of the graph paper 51 and during adjustment and running of the recorder 50 through its range for adjustment of the range and zero and for moving the pen 54 down and to starting positon to make the desired ink record.

FIG. 4 is a schematic diagram showing (a) the force transducer 27 connected with the transducer exciter demodulator 57, the latter, in turn, being connected with the Y circuit of the X-Y recorder 50 and (b) the linear transducer 36 connected with the transducer exciter demodulator 58, the latter, in turn, being connected with the X circuit of the X-Y recorder 50. Thus, when the screw 11 of the jack 8 moves upwardly by energization of hydraulic motor 4 or by rotation of knob 17, the spring 31 under test, upon contact with head 32 will apply a load on the force transducer 27 and its output signal will actuate the servo motor 56 to move the pen 54 along the Y axis in accordance with the magnitude of the load. At the same time, the deflection of the spring 31 will move the probe 37 in the case 35 of the linear transducer 36 and its output signal will actuate the servo motor 53 to move the carriage 52 on which the pen 54 is mounted along the X axis in accordance with the amount of deflection of the spring 31 under the applied load. Such pen 54 and carriage 52 movements then produce the trace 62 on the graph paper 51.

In the present example, as the spring 31 is deflected from its solid line position to its dotted line position in FIG. 1 it would have load vs. deflection characteristics as depicted by the trace 62. The upper line represents the load and deflection of the spring 31 as the plate 24 is moved upwardly, and the lower line represents the return of the spring 31 to its original condition by downward movement of the plate 24, there being a hysteresis loss in the spring 31 itself. As represented by the loop-like traces, the loads, deflections, and hysteresis losses vary slightly when the spring 31 is flexed over smaller and different ranges. In any event, as the spring 31 is being flexed, the load thereon and the deflection thereof are simultaneously recorded by the pen 54 through the output signals from the respective transducers 27 and 36 through the demodulators 57 and 58 which, in turn, have output signals precisely proportional to the varying load and deflection of the spring 31 for predeterminedly driving the respective servo motors 56 and 53 so as to position the pen 54 at the instantaneous load and deflection.

It has been found that in a matter of seconds, spring characteristics may be determined once the setup has been made for a particular size and type of spring, whereupon the operator gets a trace or curve 62 (or one of those of shorter range) recorded on the graph paper 51 and from that curve he immediately knows how much deflection the tested spring should have when installed in a relief or other valve, and thus the tested spring will operate in the valve at the desired precise range as noted from the graph.

Cycling of the tester may be automatically controlled if desired, but herein there are provided push buttons 68 and 69 for causing up and down movement of the screw 11. In a typical tester, the full range of force may be from 0 to 4000 lbs., and of lineal travel from 0 to 8″. Calibration may be accomplished between ¼ lb./in. and 500 lb./in. or force and between .001 in./in. and 1.0 in./in. of linear measurement.

Other modes of applying the principle of the invention may be employed, change being made as regards the details described, provided the features stated in any of the following claims, or the equivalent of such, be employed.

We therefore particularly point out and distinctly claim as our invention:

1. A spring tester for visually graphing the load vs. deflection characteristics of a compression spring comprising:
   a base structure having thereon a plurality of members relatively movable to apply force to a spring under test, said members comprising an upper plate fixed on said base structure and engaging one side of said spring, a middle plate movable relative to said base structure and engaging the other side of said spring, a lower plate movable relative to said middle plate and to said base structure, and a force producing ram mechanism on said base structure engaging said lower plate thus to move the latter;
   a force transducer engaging said middle plate and said lower plate, operative to transmit force from said ram mechanism and said lower plate to said middle plate and to provide a first electrical signal proportional to the relative movement between said middle and lower plates,
   a movement transducer engaged with said middle and upper plates to provide a second electrical signal therefrom proportional to the amount of deflection of the spring by said force; and
   an electrically responsive X-Y recorder having a recording pen moved in the coordinate directions by said first and second electrical signals from said transducers to graph the load vs. deflection characteristics of the spring under test.

2. A spring tester as set forth in claim 1 wherein said movement transducer is a linear differential transformer.

References Cited by the Examiner
UNITED STATES PATENTS

| 2,555,633 | 6/1951 | Comins | 73—89 |
| 3,136,158 | 6/1964 | Wharff et al. | 73—89 |
| 3,138,952 | 6/1964 | Dobbins | 73—89 |
| 3,165,926 | 1/1965 | Orr et al. | 73—161 |

DAVID SCHONBERG, *Primary Examiner.*

LOUIS R. PRINCE, *Examiner.*

M. B. HEPPS, *Assistant Examiner.*